United States Patent
Ishikawa et al.

(10) Patent No.: US 6,530,409 B1
(45) Date of Patent: Mar. 11, 2003

(54) PNEUMATIC TIRE INCLUDING SELF-SEALING MATERIAL AND METHOD OF MANUFACTURING THE SAME

(75) Inventors: Takeshi Ishikawa, Kakogawa (JP); Kiyoshi Ochiai, Kobe (JP)

(73) Assignees: Sumitomo Rubber Industries, LTD, Kobe (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/520,712

(22) Filed: Mar. 8, 2000

(30) Foreign Application Priority Data

Mar. 8, 1999 (JP) .......................... 11-060226

(51) Int. Cl.$^7$ .......................... B29D 30/08; B60C 19/12
(52) U.S. Cl. .................. 152/506; 152/510; 156/115; 156/123
(58) Field of Search ............... 156/115, 122, 156/503, 157–159, 123, 130.7, 133; 152/506, 505, 507, 510, 502, 503

(56) References Cited

U.S. PATENT DOCUMENTS

| | | | | |
|---|---|---|---|---|
| 567,457 A | * | 9/1896 | Doughty | 156/122 |
| 654,900 A | * | 7/1900 | Knadler | 156/122 |
| 1,298,661 A | * | 4/1919 | Case | |
| 1,311,738 A | * | 7/1919 | Armstrong | 156/115 |
| 1,992,514 A | * | 2/1935 | Taylor et al. | 156/115 |
| 2,537,107 A | * | 1/1951 | Waber | 156/115 |
| 2,688,996 A | * | 9/1954 | Loomis | 156/122 |
| 3,237,673 A | * | 3/1966 | Ward | 156/122 |
| 3,930,528 A | * | 1/1976 | Harrington | |
| 4,453,992 A | * | 6/1984 | Kuan et al. | |
| 5,099,900 A | * | 3/1992 | Gomberg | 152/506 |
| 5,900,088 A | * | 5/1999 | Yamagiwa | 156/115 |
| 6,159,403 A | * | 12/2000 | Yamagiwa | 156/115 |

FOREIGN PATENT DOCUMENTS

| | | | | |
|---|---|---|---|---|
| EP | 816133 | * | 1/1998 | |
| EP | 1034916 | * | 9/2000 | |
| JP | 53-124803 | * | 10/1978 | 156/115 |
| JP | 58-56838 | * | 4/1983 | 156/122 |
| JP | A8 323875 | | 12/1996 | |
| WO | WO 99/28115 | * | 6/1999 | |

OTHER PUBLICATIONS

Abstract for Japan 8–323875.*
Blow, Rubber Technology and Manufacture pp. 349–371, 1971.*

* cited by examiner

*Primary Examiner*—Steven D. Maki
(74) *Attorney, Agent, or Firm*—Birch, Stewart, Kolasch & Birch, LLP

(57) ABSTRACT

A pneumatic tire comprises a tread portion in which an annular anti-adhesive sheet is embedded along the inside of the tire, the annular anti-adhesive sheet made of a material which does not firmly adhere to the adjacent rubber so as to form a bag-like portion as an unbonded part extending continuously in the tire circumferential direction, the bag-like portion filled with a self-sealing material for self-sealing punctures, the anti-adhesive sheet having circumferential ends being spliced, and in the spliced portion, at least one of the circumferential ends disposed radially inwards of the other circumferential end has an edge inclined at an angle of from 30 to 60 degrees with respect to the widthwise direction of the anti-adhesive sheet. In a method of manufacturing the pneumatic tire, the step of building a green tire includes a step of embedding the anti-adhesive sheet; and after the tire is vulcanized, the self-sealing material is injected into the bag-like portion.

8 Claims, 7 Drawing Sheets

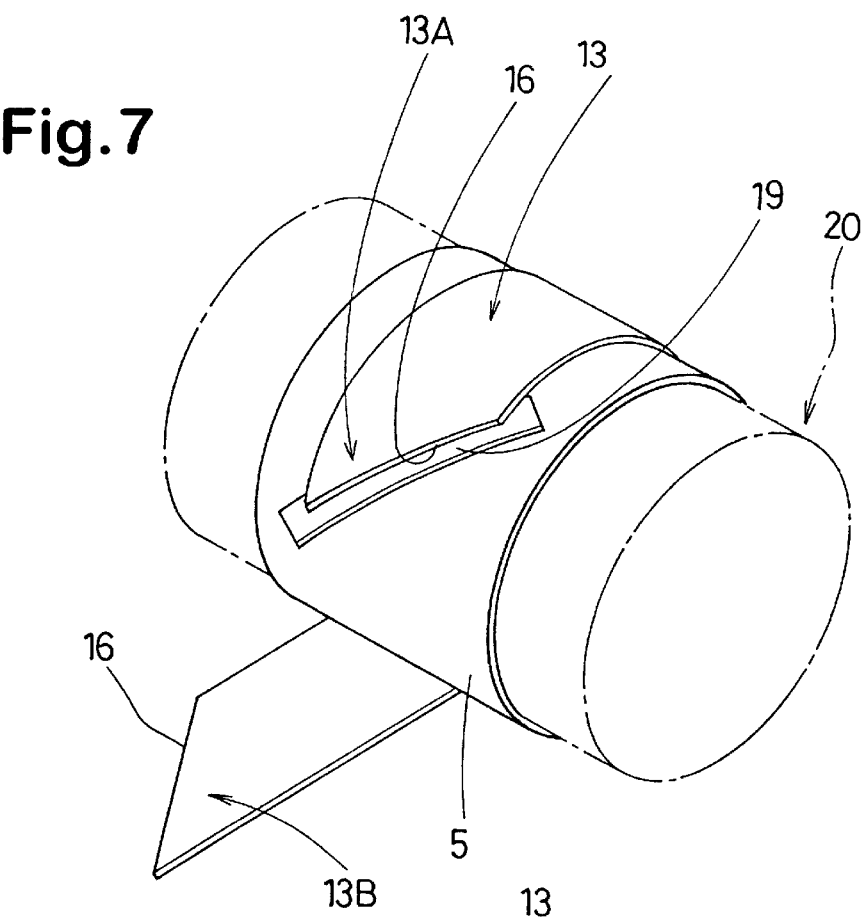
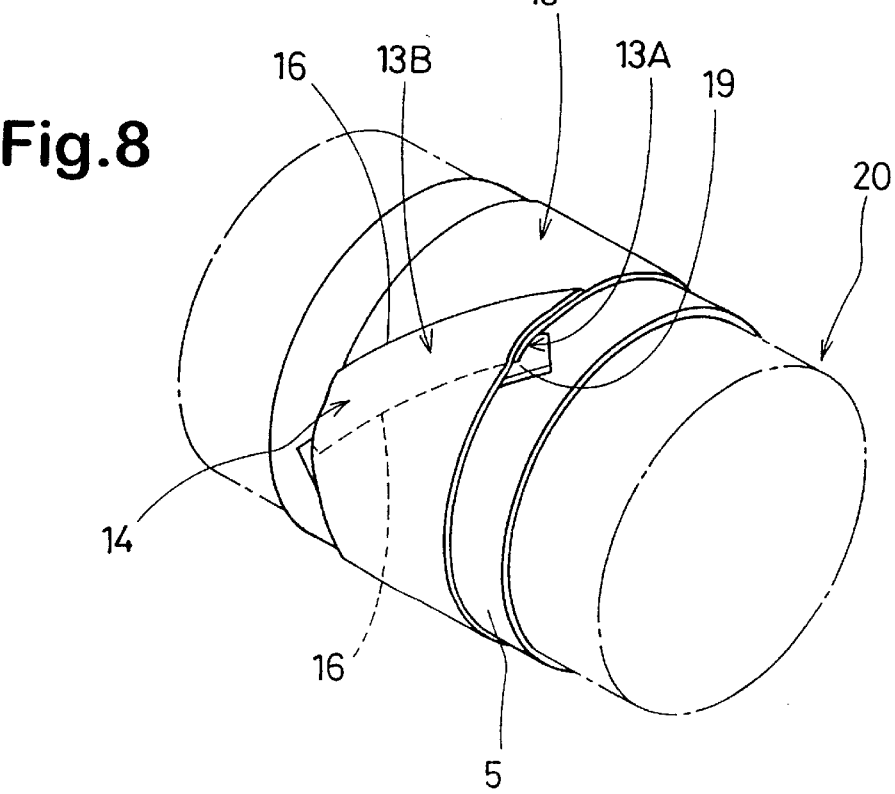

PNEUMATIC TIRE INCLUDING SELF-SEALING MATERIAL AND METHOD OF MANUFACTURING THE SAME

The present invention relates to a pneumatic tire including a packed puncture sealant layer and a method of manufacturing the same.

In the laid-open Japanese patent application No. 8-323875, a method of making a tire which has a sealing fluid layer for self-sealing tread punctures has been proposed, wherein the tire is provided inside the tread with a bag-like portion which is flat during making and vulcanizing the tire, but after the tire is vulcanized, filled with an injected sealing fluid. This bag-like portion is an unbonded part between the carcass and the inner liner formed by applying talc (a release agent for the tire and mold) thereto to prevent them from bonding together.

In this method, however, it is difficult to stably form the bag-like portion with accuracy. If the applied talc is insufficient, unbonded part is not formed. Thus, the talc tends to be applied more than enough. As a result, there is a possibility that the bonding between the inner liner and the carcass becomes partially insufficient.

It is therefore, an object of the present invention to provide a pneumatic tire and a manufacturing method therefor, in which a bag-like portion into which a self-sealing material is injected can be formed stably with accuracy without lowering the production efficiency.

According to one aspect of the present invention, a pneumatic tire comprises
a tread portion,
an annular anti-adhesive sheet embedded in the tread portion along the inside of the tire, the annular anti-adhesive sheet made of a material which does not firmly adhere to adjacent rubber so as to form a bag-like portion as an unbonded part extending continuously in the tire circumferential direction,
the bag-like portion filled with a self-sealing material for self-sealing punctures, and
the anti-adhesive sheet having circumferential ends being spliced, and in the spliced portion, at least one of the circumferential ends disposed radially inwards of the other circumferential end having an edge inclined at an angle of from 30 to 60 degrees with respect to the widthwise direction of the anti-adhesive sheet.

According to another aspect of the present invention, a method of manufacturing the pneumatic tire comprises the steps of: building a green tire, which includes a step of embedding the anti-adhesive sheet; vulcanizing the green tire; and injecting the self-sealing material into the bag-like portion after the tire is vulcanized.

Embodiments of the present invention will now be described in detail in conjunction with the accompanying drawings.

FIGS. 5 to 11 are diagrams for explaining a method of manufacturing the pneumatic tire according to the present invention.

Figure 1:
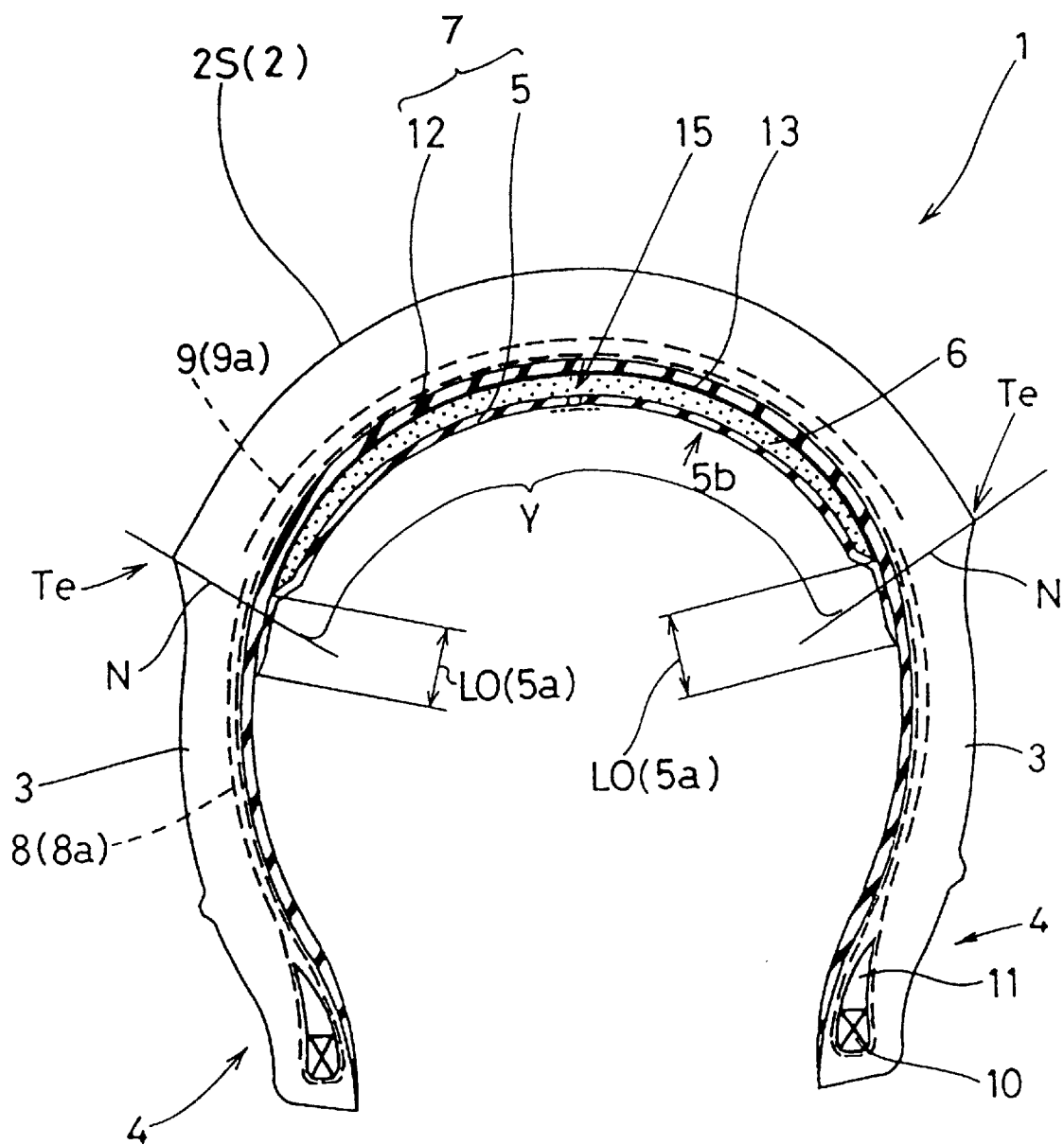
FIG. 1 is a cross sectional view of a pneumatic tire according to the present invention.

According to the present invention, a pneumatic tire 1 has a tread portion 2, a sidewall portion 3 extending radially inwardly from each of tread edges Te or the axial edges of the tread portion 2, and a bead portion 4 at the radially inner end of each of the sidewall portions 3. The tire 1 is reinforced with a carcass 8 extending between the bead portions 4, and inside the carcass 8, an airtight inner liner is disposed.

In the embodiment shown in FIG. 1, the tire 1 is a motorcycle tire of which tread portion 2 is curved at a relatively small radius of curvature in comparison with the passenger car tires, and the maximum width of the tire lies between the tread edges Te.

The carcass 8 comprises at least one ply 8a of carcass cords extending between the bead portions 4 through the tread portion 2 and sidewall portions 3 and turned up around a bead core 10 in each bead portion 4 to be secured thereto. As to the carcass structure, a radial or semiradial structure in which the carcass cords are arranged at an angle of from 70 to 90 degrees with respect to the tire circumferential direction, and a bias structure which comprise at least two cross plies of carcass cords arranged at an angle of from 35 to 70 degrees with respect to the tire circumferential direction, may be used. In this embodiment, the carcass 8 is composed of a single ply 8a of a radial structure.

In the tread portion 2, a belt 9 may be disposed radially outside the carcass 8 to reinforce the tread portion 2, wherein the belt 9 is defined as comprising at least one ply 9a of cords laid at an angle of from 0 to 70 degrees with respect to the tire circumferential direction and/or at least one ply 9a of windings of at least one cord wound at a small angle (about 10 degrees to 0 degrees) with respect to the tire circumferential direction. The tread reinforcing belt 9 is optional. It is possible to omit such a belt structure according to the tire structure, required characteristics and the like. In this embodiment, a single belt ply 9a (breaker) extending across the substantially entire width of the tread portion 2 is disposed.

In each of the bead portions 4, a bead apex 11 made of a radially outwardly tapering hard rubber is disposed radially outside the above-mentioned bead core 10.

The above-mentioned airtight inner liner comprises: a rubber layer 7 extending all over the inside of the tire; an anti-adhesive sheet 13 embedded in the rubber layer 7 to form a bag-like portion; and a self-sealing material 6 filling the bag-like portion to form a puncture sealant layer.

The anti-adhesive sheet 13 extends continuously in the tire circumferential direction, and is made of a material which does not firmly adhere to the vulcanized rubber of the rubber layer 7 and which can elongate accompanying with elongation of the surrounding rubber both during building the green tire and during vulcanizing the tire. It is therefore preferable that, when a load of 400 grams (/8 mm width) is applied to the sheet 13, the elongation thereof is not less than 20%.

For the anti-adhesive sheet 13, a polyfluoroethylene resin film is preferably used. Further, a nylon film for example made of nylon-6 can be used too. Table 1 shows various properties of a concrete example of such nylon film. In case of the nylon film, it can fully function as the anti-adhesive sheet 13 even if the thickness is decreased to a very small value of 25 micrometers. In practice, however, a more large value is set on the thickness in view of handling. Usually, the thickness of such plastics film inclusive of the polyfluoroethylene resin film, nylon film and the like is set in the range of from 0.05 to 0.15 mm, for example at 0.1 mm. Furthermore, in addition to the above-mentioned materials, other materials, for example, a film made of polyethylene or the like which is impregnated with a rubber release agent or treated with a surface finishing so as not to adhere to the rubber, may be used for the anti-adhesive sheet 13.

TABLE 1

| Item | Unit | Value | Measuring method |
|---|---|---|---|
| Density | g/cu.cm | 1.13 | gradient density tube method |
| Melting point | degrees C. | 215 | |
| Tensile strength | kg/sq.mm | 6 to 9 | ASTM-D882 |
| Elongation | % | 300 to 400 | ASTM-D882 |
| Young's modulus | kg/sq.mm | 45 to 55 | ASTM-D882 |
| Tear strength | g | 50 to 60 | ASTM-D1922 |
| Impact strength | kg-cm/mm | 1600 | falling ball impact method |
| Water vapor permeability | g/sq.m day 0.1 mm | 60 to 80 | JIS-Z208 40 deg. C., 90% RH |
| Oxygen permeability | c.c./sq.m day atm 0.1 mm | 6 | ASTM-D1434 20 deg. C. dry |
| Hayes | % | 4 to 6 | JIS-K6718 |
| Coefficient of static friction | — | 0.5 to 0.7 | |

(Thickness 30 micron, 20 degrees C., 65% RH)

In this embodiment, the above-mentioned rubber layer 7 of the inner liner is made of a sealing sheet 12 disposed along the inner surface of the carcass 8, and a packing sheet 5 disposed inside the sealing sheet 12.

The sealing sheet 12 is made of a gas-impermeable rubber compound and extends to cover all over the inside of the carcass 8 and has a substantially uniform thickness in the range of from 0.5 to 2.0 mm.

For the gas-impermeable rubber compound, butyl rubber compounds, e.g. butyl rubber, halogenated butyl rubber, brominated butyl rubber and the like are preferably used.

The packing sheet 5 extends across at least 80%, preferably 100% or more of the inside width Y of the tread portion 2. The inside width Y is defined between straight lines N drawn normal to the tread face 2S at the tread edges Te as shown in FIG. 1.

Preferably, the packing sheet 5 is made of the above-mentioned gas-impermeable rubber compound. Thus, in this embodiment, the same rubber compound as the packing sheet 5 is used. However, other compounds, for example, diene rubber compounds, e.g. styrene-butadiene rubber and the like may be used alone or in combination with the above-mentioned butyl rubber compounds, as far as it can fuse together with the gas-impermeable rubber sheet 12 by the heat during vulcanizing the tire.

The thickness of the packing sheet 5 is set in the range of from 0.5 to 2.0 mm, preferably 1.0 to 1.5 mm. If the thickness of the packing sheet 5 is less than 0.5 mm, the strength becomes insufficient, and it becomes difficult to secure the self-sealing material 6. If the thickness is more than 2.0 mm, the thickness of the self-sealing material 6 is liable to decrease in the ground contacting patch, and the tire weight unfavorably increases.

Both the axial edge parts 5a of the packing sheet 5 come into contact with the sealing sheet 12 to be bonded thereto. But, due to the presence of the anti-adhesive sheet 13, the central portion 5b therebetween is not bonded to form the bag-like portion or a space which extends continuously in the circumferential direction and filled with self-sealing material 6.

The width L0 of each of the bonded edge parts 5a is set in a range of from 4.0 to 10.0 mm, preferably 5.0 to 7.0 mm.

If the width L0 of the bonded part 5a is less than 4.0 mm, the bonding strength becomes insufficient. If the width L0 is more than 10.0 mm, the tire weight undesirably increases.

As the anti-adhesive sheet 13 is disposed between the packing sheet 5 and the sealing sheet 12, the central part 5b is prevented from bonding to the sealing sheet during vulcanizing the tire and thus the bag-like portion can be formed with accuracy.

As to the width of the anti-adhesive sheet 13, when the tread portion is curved as explained above, the occurrence of punctures is usually less in the tread edge portion than the central portion. Thus, the sheet 13 may be narrower than the entire width Y of the tread portion 2. However, when the tread portion is relatively flat, or in case of passenger car tires and the likes, it is preferable that the sheet 13 extends across the entire width of the tread portion 2.

Figure 3:
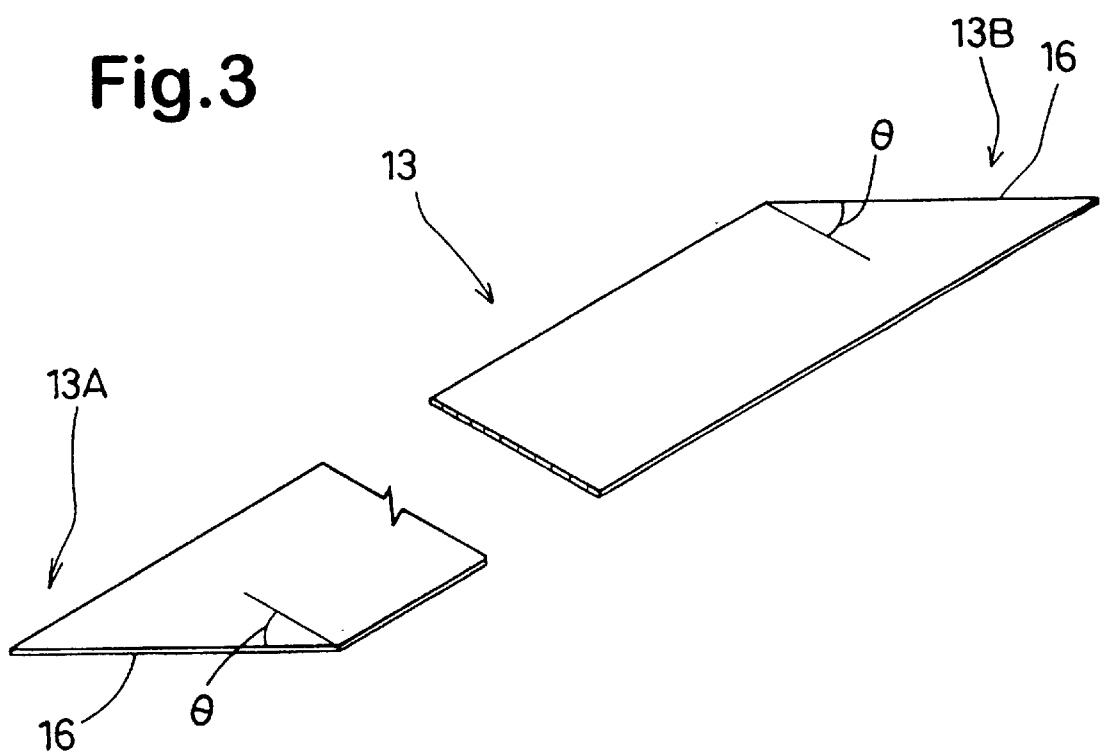
FIG. 3 is a perspective view of the developed anti-adhesive sheet.
Figure 2:
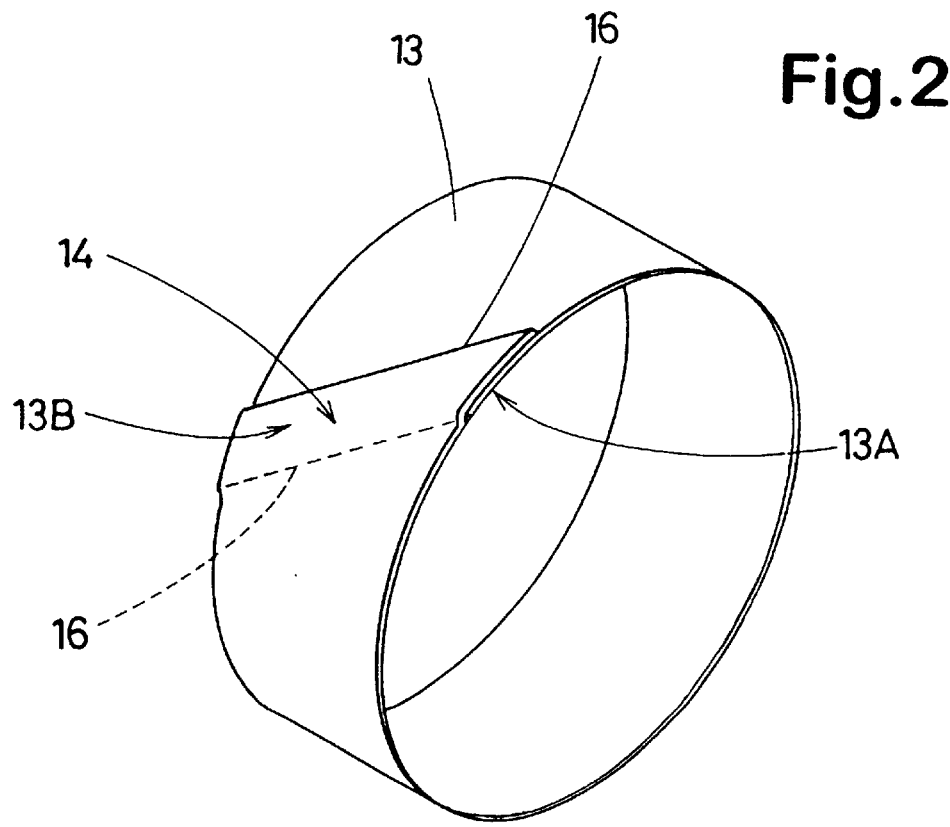
FIG. 2 is a schematic perspective view showing the anti-adhesive sheet alone.

In this embodiment, as shown in FIG. 2, the circumferential end portions 13A and 13B of the anti-adhesive sheet 13 are overlapped each other to extends continuously in the tire circumferential direction. Both the circumferential edges 16 are inclined at the same angle θ of from 30 to 60 degrees with respect to the widthwise direction of the sheet 13. Thus, the anti-adhesive sheet 13 is a parallelogram when developed as shown in FIG. 3.

The self-sealing material 6 is a viscous material which is liquid at normal temperatures (20 degrees C.) and has a viscosity coefficient of from 2.0 to 10.0 mPa·s at 20 degrees C. so as to be able to seal punctures in a wide temperature range of from −20 to 60 degrees C.

In order to inject the above-mentioned self-sealing material 6 into the bag-like portion after the tire is vulcanized, the inwardly adjacent rubber layer, in this embodiment the packing sheet 5, is provided with an injection hole 15 penetrating therethrough in advance.

Figure 5:
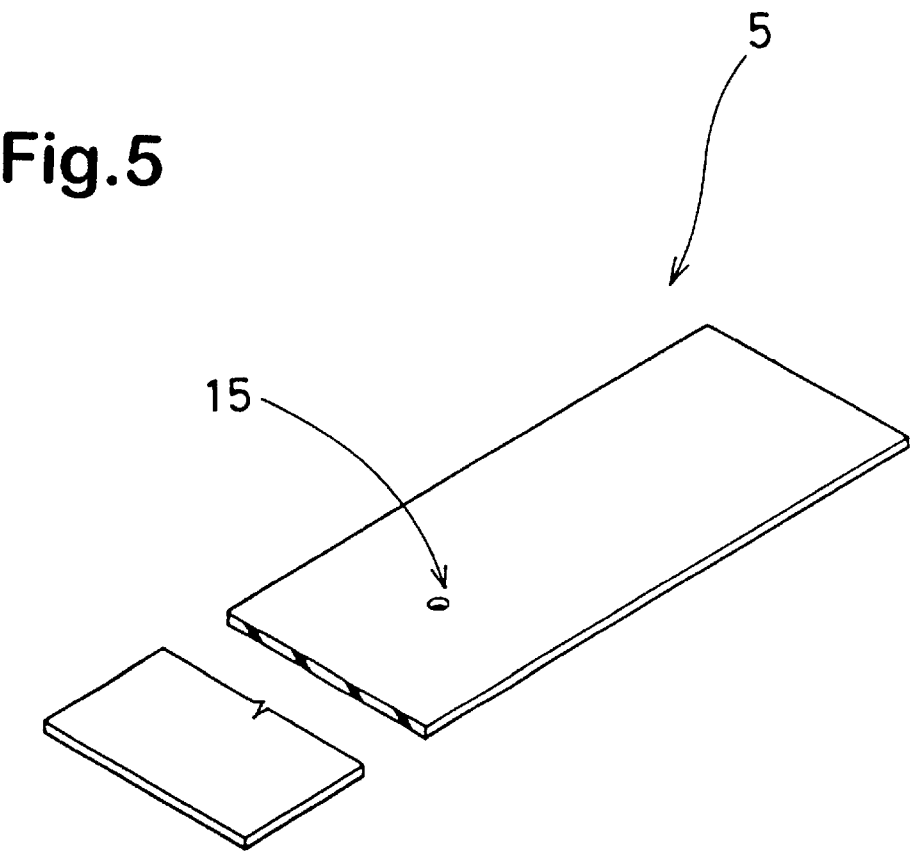

First, the above-mentioned packing sheet 5 is formed by cutting a rubber sheet into a specific width and a specific length as shown in FIG. 5. During or after the cutting, a through hole 15 of a diameter of 2 to 8 mm is formed in the center in the widthwise direction of the packing sheet 5.

This packing sheet 5 is wound on a cylindrical outer surface of a tire building drum 20, and the circumferential ends thereof are spliced.

Figure 6:
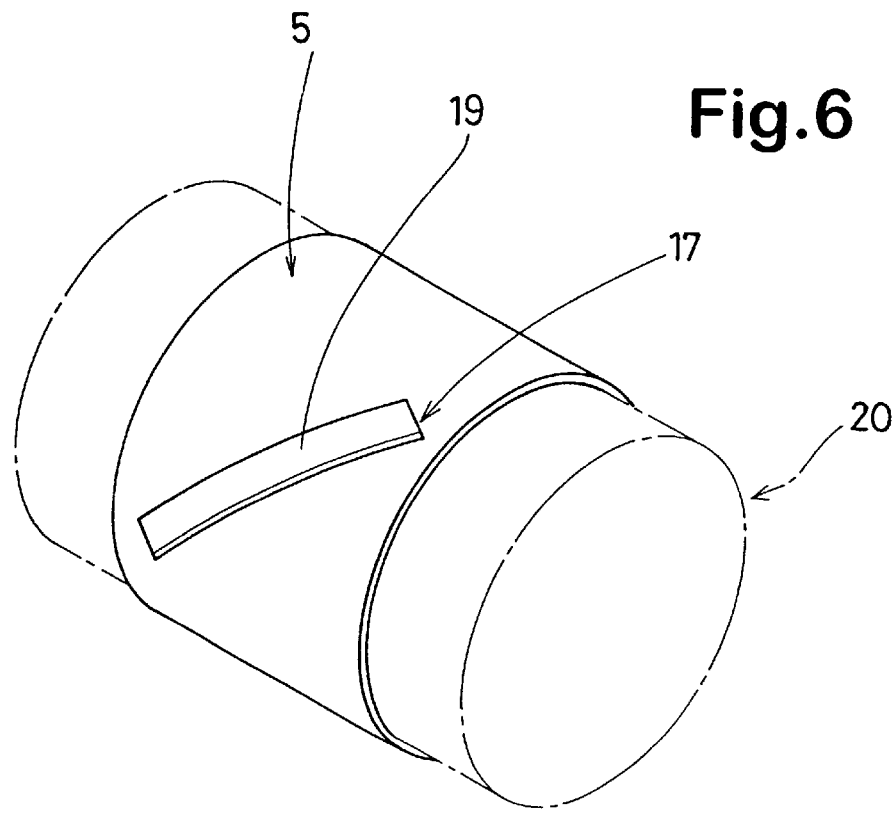

Onto the packing sheet 5, as shown in FIG. 6, a narrow and short supplementary rubber tape 19 is obliquely applied. The supplementary rubber tape 19 is made of the same material as the packing sheet 5 and the thickness thereof is set in the range of from 0.5 to 2.0 mm. The inclination of the rubber tape 19 is the same as the edge 16 of the circumferential end portion 13A of the anti-adhesive sheet 13.

Next, the anti-adhesive sheet 13 is wound on the packing sheet 5 such that the inclined edge 16 of the circumferential end portion 13A lies on the supplementary rubber tape 19 as shown in FIG. 7, and then the other circumferential end portion 13B lies on the radially outside of this circumferential end portion 13A as shown in FIG. 8. In this state, the overlap 14 is set in a range of at least 30 mm, preferably 30 to 40 mm in the circumferential direction to maintain a sufficient overlapping width after the tire is vulcanized.

Figure 9:
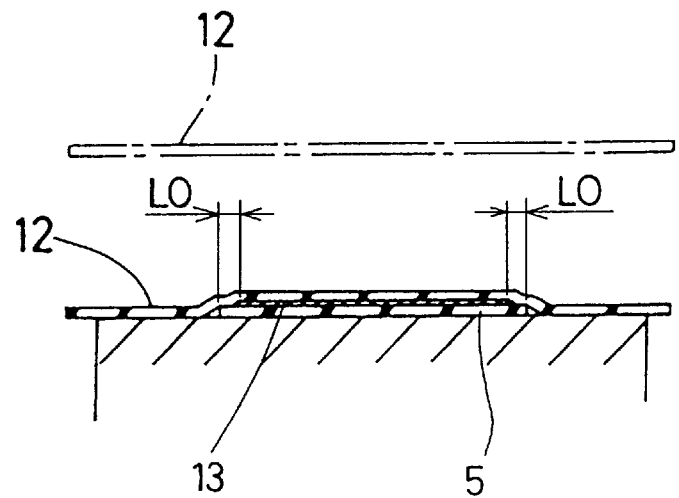

Further, on the anti-adhesive sheet 13 and packing sheet 5 which are wound on the cylindrical surface of the tire building drum 20, the sealing sheet 12 is wound as shown in FIG. 9. In this embodiment, the widths are anti-adhesive sheet 13<packing sheet 5<sealing sheet 12. As shown in FIG. 9, both the axial edge portions of the packing sheet 5 which protrude from the anti-adhesive sheet 13 come into contact with the sealing sheet 12 so that the rubber of the packing sheet 5 and sealing sheet 12 can fuse by the heat during vulcanizing the tire. The protrusion L0 from each axial edge is set in a range of from 4.0 to 10.0 mm, preferably 5.0 to 7.0 mm as explained above.

Figure 10:
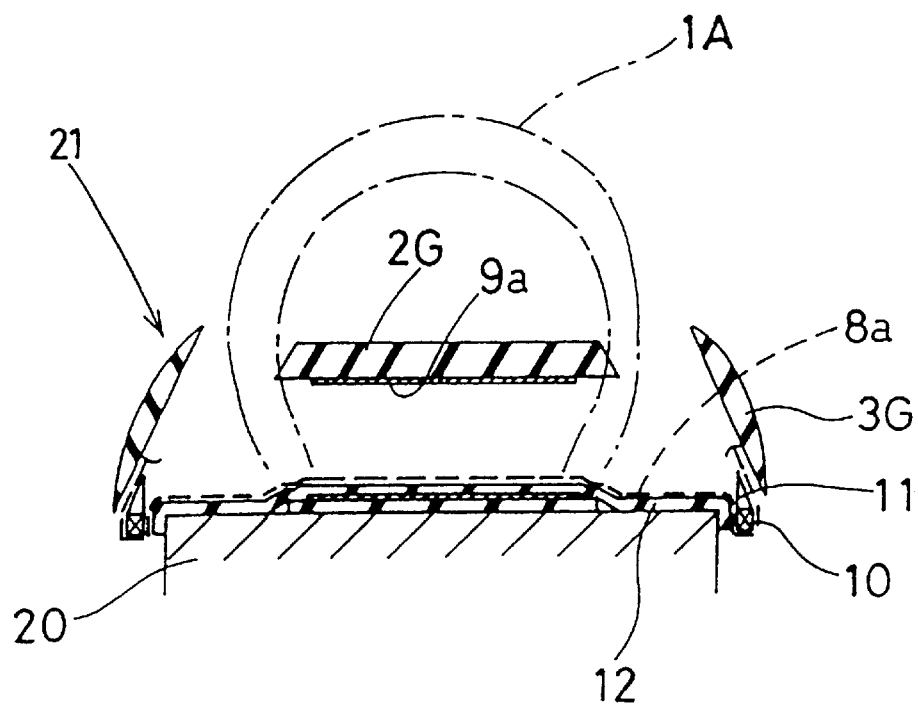

Furthermore, as shown in FIG. 10, under the cylindrical state of the tire building drum 20, a carcass 8 (carcass ply 8a) is wound on the inner liner rubber (5 and 12), bead apex rubber 11 and bead cores 10 are set, and other rubber layers and reinforcing cords layers (if any) are wound. And this assembly is shaped into a toroidal shape 1A by expanding the tire building drum 20, and a tread rubber 2G, a belt ply 9a and the like are further applied thereto. Also, the edges of the carcass ply are turned up around the bead cores 10 and sidewall rubber 3G and the like are also applied. Thereby, the green tire 1 is made.

The green tire is put in a mold and vulcanized by applying heat and pressure thereto. As a result, the axial edge portions of the packing sheet 5 are bonded to the sealing sheet 12, but the central portion in which the anti-adhesive sheet 13 exists is not bonded.

Figure 11:
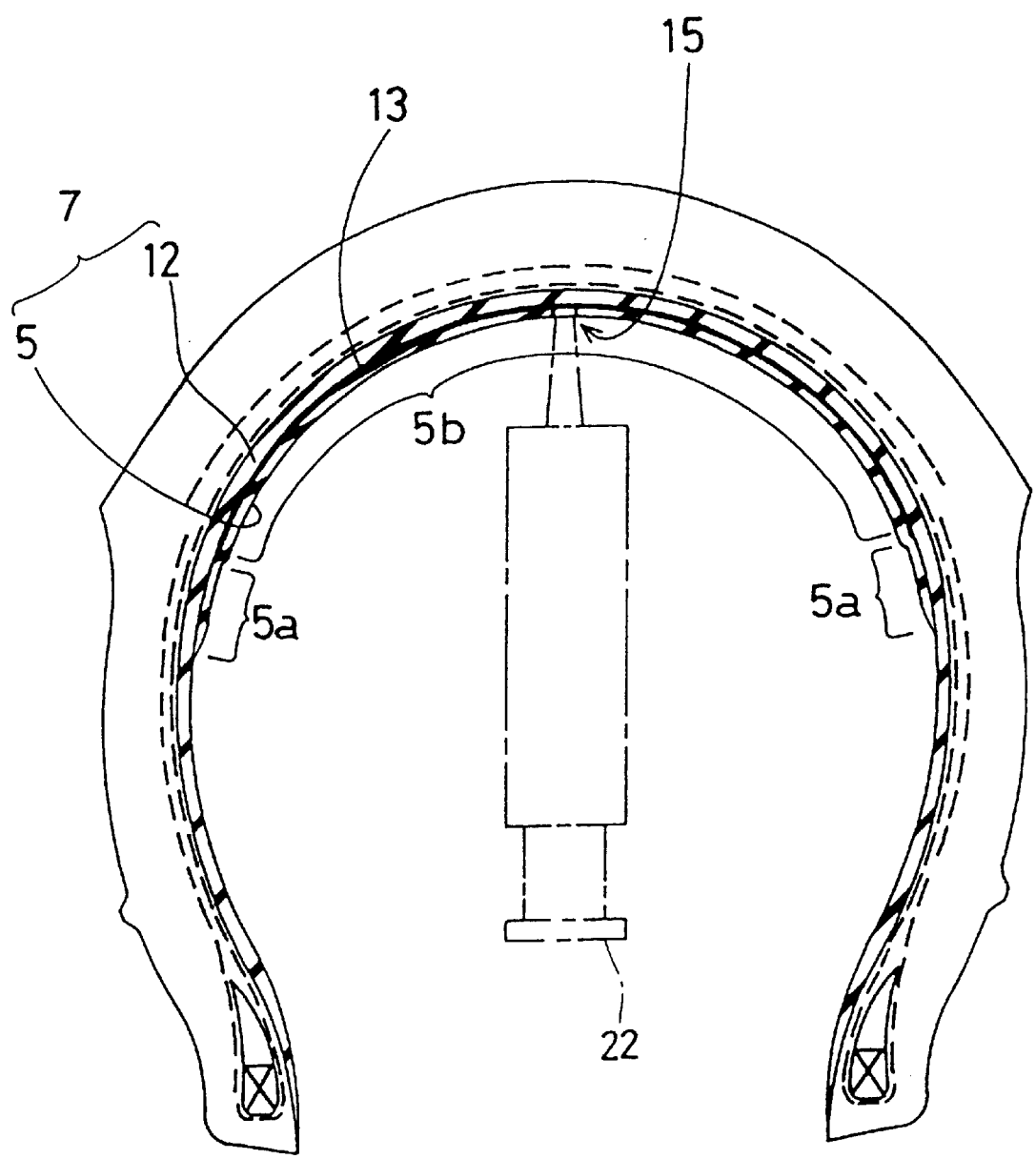

After the vulcanized tire is took out from the mold, a predetermined quantity of the self-sealing material 6 is injected into the unbonded part 5b between the sealing sheet 12 and packing sheet 5 from the injection hole 15 using an injector 22 as shown in FIG. 11.

After the self-sealing material 6 is injected, the injection hole 15 is closed by a patch of rubber sheet and the like fix by means of an adhesive agent.

Thus, a layer of the self-sealing material 6 having a certain thickness is formed along the radially inside of the tread portion 2.

Figure 4A:
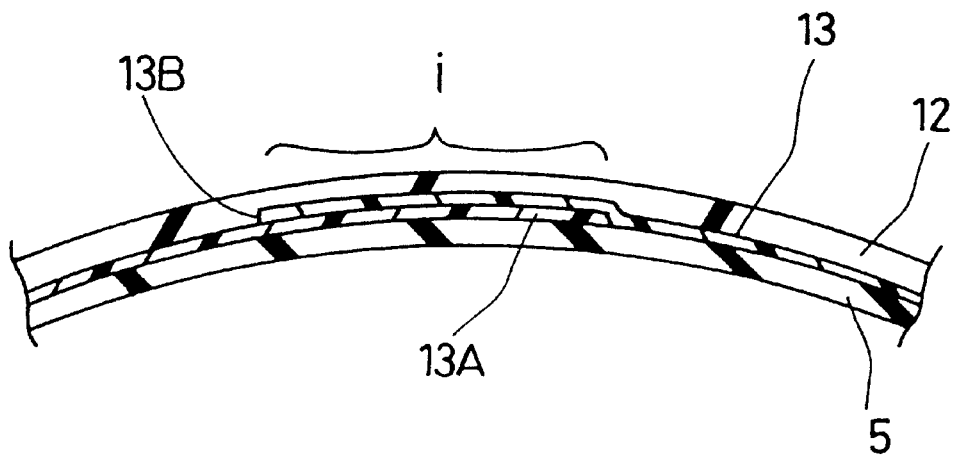
FIGS. 4A and 4B are cross sectional views for explaining a problem in splicing the anti-adhesive sheet.
Figure 4B:
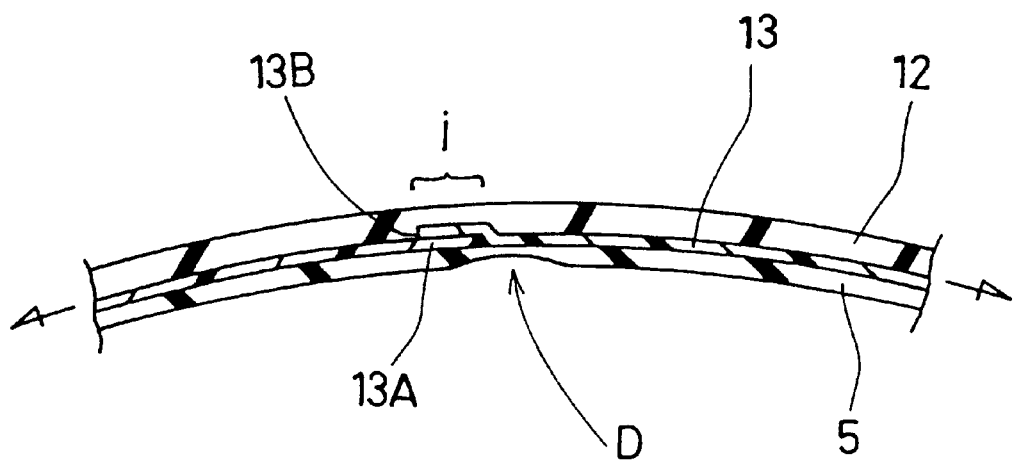

As shown in Figs. 4A and 4B, when the anti-adhesive sheet 5 and the adjacent rubber is subjected to a tensile stress and the amount (i) of overlap 14 is decreased due to the elongation percentage of the anti-adhesive sheet which is smaller than the rubber, as the rubber quantity is very large on the outside of the anti-adhesive sheet 13, the thickness change (decrease) can be neglected. However, on the inside of the anti-adhesive sheet 13, as the rubber quantity is very small, the thickness decrease (D) sometimes becomes inneglectable.

If the radially inward circumferential end 13A is inclined at a small angle less than 30 degrees, the thin part (D) concentrates, and as a results, the thickness decrease is furthered. Thus, this part is liable to become a weak point, and further there is a possibility of disturbing the tire uniformity.

In the present invention therefore, the radially inward circumferential end 13A is inclined at a specific angle θ in order to circumferentially disperse such possible thickness decrease (D). In this embodiment further, to prevent the thickness decrease (D) positively the supplementary rubber tape 19 is disposed in advance. As an alternative to the supplementary rubber tape 19, a splicing part of the packing sheet 5 or the inwardly adjacent rubber layer may be used when the circumferential edges of the packing sheet 5 are inclined at the same angle of the edge 16 of the anti-adhesive sheet 13, and the edge 16 of the anti-adhesive sheet 13 is placed in this splicing part.

As known from the above description, it is not always necessary to incline the edge 16 of the radially outward circumferential end 13B at the angle θ. It may be inclined at a small angle less than 30 degrees for example 0 degrees. However, in view of the tire uniformity, the edge of the radially outward circumferential end 13B is also inclined at the same angle θ.

In the above-explained embodiment, the packing sheet 5 having a narrower strip width is disposed inside the sealing sheet 12. However, this relationship may be reversed. That is, the packing sheet 5 having a narrower strip width may be disposed outside the sealing sheet 12. The anti-adhesive sheet 13 is disposed therebetween in this case too. Of course, in this case, the foregoing description relating to the position and the order of winding the packing sheet 5 and sealing sheet 12 must be reversed correspondingly.

Comparison Tests

Motorcycle tires of size 3.00–10 were made and checked for rents in the packing sheet and thickness decrease in the packing sheet. The tires had the same structure except for the anti-adhesive sheet. The carcass was composed of two plies of 2/940 dtex nylon cords arranged at +42 and −42 degrees with respect to the tire equator at a cord count of 43 (/5 cm) and turned up around the bead cores. The tread reinforcing belt was not provided. The test results are shown in Table 2.

TABLE 2

| Tire | Ref. | Ex.1 | Ex.2 |
| --- | --- | --- | --- |
| Anti-adhesive sheet | | | |
| Material | polyfluoro-ethylene | polyfluoro-ethylene | polyfluoro-ethylene |
| Inclination angle of edges | | | |
| inner (deg.) | 0 | 30 | 30 |
| outer (deg.) | 0 | 30 | 30 |
| Overlap (mm) | 30 | 30 | 30 |
| Supplementary rubber tape | none | none | present |
| Thickness (mm) | — | — | 0.5 |
| Width (mm) | — | — | 10 |
| Test Results | | | |
| Packing sheet | | | |
| Rent (%)*1 | 30 | 0 | 0 |
| Thickness decrease (%)*1 | 100 | 40 | 0 |

*1) Rate of occurrence

From the tests, it was confirmed that, in the tires according to the present invention, the bag-like portion can be formed with accuracy without rent, though the bag-like portion of the reference tire tears 100%.

As described above, the anti-adhesive sheet is used in the present invention. Therefore, the widths of the unbonded part 5b band bonded part 5a can be easily controlled to form the bag-like portion with accuracy. Thus, an effectual sealant layer can be formed stably. Further, the anti-adhesive sheet can protect the inwardly adjacent rubber layer from a nail or the like piercing the tread rubber if the length of the protrusion is not so large, and the self-sealing material can be prevented from leaking and being partial. Thus, the tire uniformity can be improved.

What is claimed is:

1. A pneumatic tire comprising a tread portion,
   an annular anti-adhesive sheet embedded in the tread portion along the inside of the tire, and an inner rubber sheet,
   the annular anti-adhesive sheet made of a material that does not firmly adhere to adjacent rubber so as to form a bag portion as an unbonded part extending continuously in the tire circumferential direction,
   said bag portion filled with a self-sealing material for sealing punctures, and
   said anti-adhesive sheet having circumferential ends being spliced to define a spliced portion, and
   in the spliced portion, at least one of the circumferential ends disposed radially inwards of the other circumferential end having an edge inclined at an angle of from 30 to 60 degrees with respect to the widthwise direction of the anti-adhesive sheet, wherein a supplementary narrow rubber layer made of the same material as the inner rubber sheet is disposed inside the anti-adhesive sheet such that the supplementary narrow rubber layer extends along one of the circumferential ends which is disposed radially inwards of the other circumferential end.

2. The pneumatic tire according to claim 1, wherein the edges of both the circumferential ends of the anti-adhesive sheet are inclined at the substantially same angles.

3. The pneumatic tire according to claim 1, wherein the anti-adhesive sheet is embedded in a gas-impermeable inner liner disposed along the inside of the tire.

4. A pneumatic tire according to claim 3, wherein said inner liner comprises an outer rubber sheet made of a gas-impermeable rubber compound extending substantially all over the inside of the tire, and the inner rubber sheet disposed inside the outer rubber sheet in the tread portion, and said anti-adhesive sheet is disposed between said outer rubber sheet and inner rubber sheet.

5. The pneumatic tire according to claim 3, wherein said inner liner comprises the inner rubber sheet made of a gas-impermeable rubber compound extending substantially all over the inside of the tire, and an outer rubber sheet disposed outside the inner rubber sheet in the tread portion, and said anti-adhesive sheet is disposed between said outer rubber sheet and inner rubber sheet.

6. A method of manufacturing a pnuematic tire provided in a tread portion extending continuously in the tire circumferential direction and filled with a self-sealing material for sealing punctures, said method comprising building a green tire provided with an annular anti-adhesive sheet embedded in rubber in a tread portion thereof along the inside of the tire, and in rubber sheet, wherein said annular anti-adhesive sheet is made of a material which does not firmly adhere to the adjacent rubber, said annular anti-adhesive sheet has circumferential ends spliced to define a spliced portion, and in the spliced portion, at least one of the circumferential ends which is disposed radially inwards of the circumferential end has an edge inclined at an angle of from 30 to 60 degrees with respect to the widthwise direction of the anti-adhesive sheet, and a supplementary narrow rubber layer made of the same material as in the rubber sheet disposed inside the anti-adhesive sheet such that the supplementary narrow rubber layer extends along one of the circumferential which is disposed radially inwards of the other circumferential end, vulcaninizing the green tire, through which said bag portion is formed by the anti-adhesive sheet as an unbonded part in the rubber, and injecting the self-sealing material into the bag portion after the tire vulcanized.

7. The method according to claim 6, wherein the step of building a green tire comprises:

making the inner rubber sheet, the inner rubber sheet defining the innermost rubber layer in the tread portion;

providing the inner rubber sheet with an injection hole for injecting the self-sealing material;

winding the inner rubber sheet around a tire building drum;

winding the anti-adhesive sheet on the inner rubber sheet wound on the tire building drum;

splicing the circumferential ends of the anti-adhesive sheet;

winding an outer rubber sheet on the anti-adhesive sheet and inner rubber sheet wound on the tire building drum so that the anti-adhesive sheet is embedded between the outer rubber sheet and the inner rubber sheet; and winding at least one carcass ply around the outer rubber sheet, and wherein said injecting of the self-sealing material into the bag portion is made by using said injection hole.

8. The method according to claim 7, wherein the edges of both the circumferential ends of the anti-adhesive sheet are inclined at the substantially same angle, and in splicing the circumferential ends, the overlap thereof is in the range of from 30 to 40 mm in the tire circumferential direction.

* * * * *